United States Patent [19]

Nishi

[11] 4,141,168
[45] Feb. 27, 1979

[54] FISH CATCHER

[76] Inventor: Chikao Nishi, 6-12, 3-chome, Kaorigaoka, Sakai-shi, Osaka, Japan

[21] Appl. No.: 823,536

[22] Filed: Aug. 10, 1977

[30] Foreign Application Priority Data

Nov. 22, 1976 [JP] Japan .................. 51-141021

[51] Int. Cl.² .................................................. A01E 97/12
[52] U.S. Cl. ............................................... 43/15; 43/37
[58] Field of Search ............... 43/15, 37, 42.72, 44.92

[56] References Cited

U.S. PATENT DOCUMENTS

| 2,934,848 | 5/1960 | Lybyer | 43/15 |
| 3,470,646 | 10/1969 | Erkkila | 43/15 |
| 3,559,326 | 2/1971 | Henderson | 43/15 |

Primary Examiner—James L. Jones, Jr.
Attorney, Agent, or Firm—Spensley, Horn & Lubitz

[57] ABSTRACT

A fish catcher to be suspended beneath the water by a fishing line, comprising an elastic linear material bent within its elasticity to form a loop closed by means of a disengageable hook-and-ring latch mechanism, said loop, when the latch mechanism is disengaged by downward pulling force of the weight of a fish snapping at a bait, springing outward by the force of elastic restitution, and thereby causing the fishing line to be automatically pulled upward and securing the bite of the fish.

8 Claims, 9 Drawing Figures

FISH CATCHER

BACKGROUND OF THE INVENTION

1. Field of the Invention

This invention relates to a structure of a fish catcher, more particularly a fish catcher which automatically secures the bite of a fish snapping at a bait.

2. Prior Art

It is a charm of fishing to successfully hook a fish snapping at a bait and draw it into one's hand. A conventional fishing method, be it by means of a rod and a fishing line, or a hand-fishing line, with or without a float, depends largely upon an angler's flair and skill to detect a slightest change in condition of a bait beneath the water and to know exactly when and how to pull the fishing line in order to secure the bite of a fish snapping at the bait. The angler's ability to properly execute this task is fostered by experiences of trial and error, while he diligently watches the movement of a float or, when no float is used, concentrates in perceiving through hand even the slightest change in condition of the bait.

The attraction of fishing is enlightened, paradoxically speaking, by the high level of skill necessary to accomplish this task, viz., "striking the fish." Successful anglers are very proud of their accomplishment. However, to the majority of people who go fishing for pleasure, the requirement of the high level of such skill is a mere obstacle to their pleasure.

BRIEF SUMMARY OF THE INVENTION

Accordingly, it is the primary object of the present invention to provide a structure of a fish catcher which, regardless of the level of skill of an angler, automatically secures the bite of a fish snapping at a bait.

It is another object of the present invention to avoid the breaking of a fishing line caused by the angler's attempt to secure the fish bite.

In keeping with the principles of the present invention, the objects are accomplished with a unique and yet simple structure comprising primarily an elastic linear material bent within its elasticity to form a loop which is closed by means of a disengageable hook-and-ring latch mechanism. Said loop, when in use, is suspended from a fishing line and immersed in the water. A hook line of predetermined length is connected to said loop. When a fish snaps at a bait, the hook line is pulled downward by the weight of the fish. This downward pulling force causes the hook-and-ring latch mechanism to be disengaged. Such disengagement allows the loop to spring outward by the force of elastic restitution. Because the hook line is of pre-determined length, when the loop springs outward, the hook line connected to the loop is pulled by such resilient movement of the loop, and works to secure the bite of the fish.

When an angler, using a conventional fishing method, pulls a fishing line in order to catch a fish jaw and secure the bite, such pulling movement tends to be sudden and inflexible in the vertical direction directly opposite to the downward pulling force of the weight of the fish. This movement is often a cause for breaking the fishing line. In contrast, the pulling by the fish catcher in accordance with the principles of the present invention is resilient and slantly upward. Therefore, such pulling tends to prevent the fishing line from breaking.

The fish catcher in accordance with the principles of the present invention, therefore, will eliminate the obstacle in joy and winnings of fishing; the high level of skill required to strike a fish without breaking a fishing line. Accordingly, said fish catcher will inevitably increase the interests in fishing among amatuer anglers and those engaged in the fishing industry.

BRIEF DESCRIPTION OF THE DRAWINGS

The novel features which are believed to be characteristic of the present invention, both as to its structure and the method of its operation, together with further objects and advantages thereof, will be better understood from the following description in connection with the accompanying drawings wherein like reference numerals denote like elements, and in which.

It is to be expressly understood that the drawings are for the purposes of illustration and description only, and are not intended as a definition of the limits of the invention.

DETAILED DESCRIPTION OF THE PREFERRED EMBODIMENT

Referring more specifically to the accompanying drawings, the embodiment of the present invention will be hereinafter described in detail.

Fundamental components of the structure in accordance with the principles of the present invention common to all the embodiments are:

(1) An elastic loop 1, comprising an arc 10 and a horizontal base 15, which is made disengageable by means of a hook 16-and-ring 17 latch mechanism;
(2) A catch ring 14;
(3) A hook line 3;
(4) A fishing hook 2; and
(5) An eyelet 8 used to connect to a fishing line 4 the fish catcher in accordance with the principles of the present invention.

Furthermore, for the purpose of facilitating the description of the preferred embodiment, said arc 10 is divided into three component parts named as follows:

(1) An arcuate ceiling 11;
(2) A left leg 12; and
(3) A right leg 13.

Said elastic loop 1 is formed by bending an elastic linear material within its elasticity. Said elastic linear material must be of a quality highly resistant to fresh and salt water and having elasticity appropriate for pre-determined thickness of the hook line 3 and a fishing line 4. An ordinary stainless steel sporting wire, for example, is one of the appropriate materials, and it may be commercially purchased without difficulty. Furthermore, said elastic linear material must be bent within its elasticity so that said elastic loop 1 retain sufficient force of elastic restitution to accomplish the objects of the present invention. Preferably, said arcuate ceiling 11 forms a smooth circular arc. However, no particular shape of said arcuate ceiling 11 need be used for the purpose of accomplishing the objects of the present invention. Similarly, said left leg 12 and said right leg 13 need not be in the forms as illustrated by FIGS. 1, 3, 4 and 5. For instance, they may be straight. Said left leg 12 is slightly longer than said right leg 13 in order to facilitate the attachment of the catch ring 14. Said catch ring 14, facing upward, extends vertically from the left leg 12 to the direction of the right leg 13. Said right leg 13 is bent at its lower end inwardly towards the left leg 12 to form the horizontal base 15. In order to form said elastic loop 1, the arc 10 and the horizontal base 15 are latched together by means of the hook 16-and-ring 17 mechanism. Said hook 16-and hook-ring 17 are firmly engaged with each other by the force of elastic restitution of the elastic loop 1. Said hook 16-and-ring 17 mechanism is so constructed that, when a fish snaps at a bait, downward pulling force due to the weight of the fish causes said mechanism to be disengaged. Such disengagement may be caused by some other force, such as repulsive force as a result of a collision between the fish catcher and the water surface when the fish catcher is casted into the water, and friction between the fish catcher and the water as the fish catcher sinks deeply into the water. Therefore, in order to prevent accidental disengagements of said hook 16-and-ring 17 mechanism, certain angle and shape of said hook 16 may be preferred over others. Said hook 16 as illustrated by the accompanying drawings has an inverted-L shape solely for the sake of simplicity of those drawings. Therefore, as in the fourth embodiment, an auxiliary guide hook 160 located adjacent to said hook 16 may be used to avoid such accidental disengagement of the hook 16-and-ring 17 mechanism. Said hook line suspends from the horizontal base 15 and traverses vertically through the catch ring 14. The diameter and position of said catch ring 14 are important factors which determine how quickly can the hook line 3 react to the disengagement of the hook 16-and-ring 17 mechanism. If the diameter of said catch ring 14 is too large and/or said catch ring 14 is located at too far below the hook 16-and-ring 17 mechanism, then the transmission to the fishing hook 2 of a resilient action of the elastic loop caused by the disengagement of the hook 16-and-ring 17 mechanism will be delayed, and such delay will inevitably result in losing the fish. Preferably, said catch ring 14 is located as close as possible to the hook 16-and-ring 17 mechanism. However, if it is located too close, then there is a possibility of the horizontal base 15 colliding with the catch ring 14 when the elastic loop 1 is released by the disengagement of the hook 16-and-ring 17 mechanism. Therefore, it is necessary that said catch ring 14 be located out of the range of such movement by the horizontal base 15. The structure, as thus been described, is common to all the embodiments of the present invention.

In keeping with the principles of the present invention, alternative embodiments are available to the following elements of the fish catcher structure:

(1) Said disengageable hook 16-and-ring 17 mechanism;
(2) Said horizontal base 15;
(3) Said hook line 3; and
(4) The overall shape of asid elastic loop 1.

Figure 1:
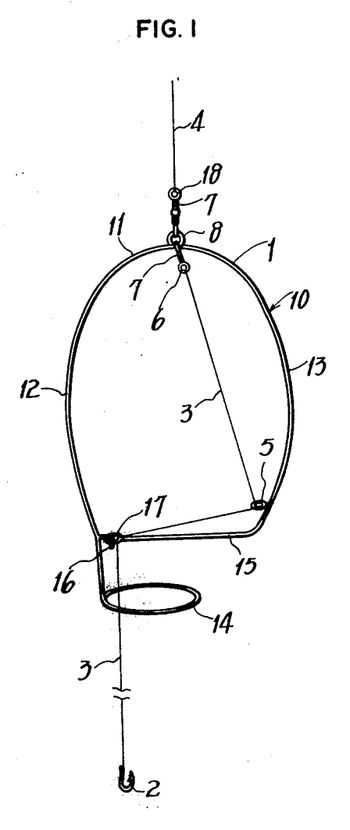
FIG. 1 is a front perspective view of a fish catcher showing a first embodiment of the invention.
Figure 2:
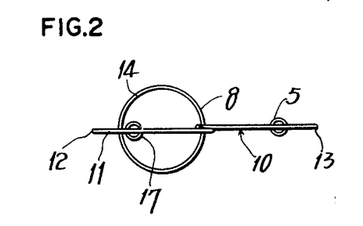
FIG. 2 is a plane view of the embodiment shown in FIG. 1.
Figure 3:
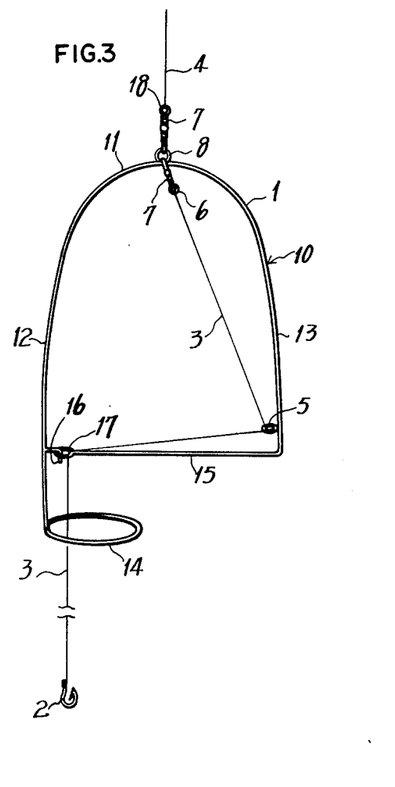
FIG. 3 is a front perspective view of a second embodiment.
Figure 4:
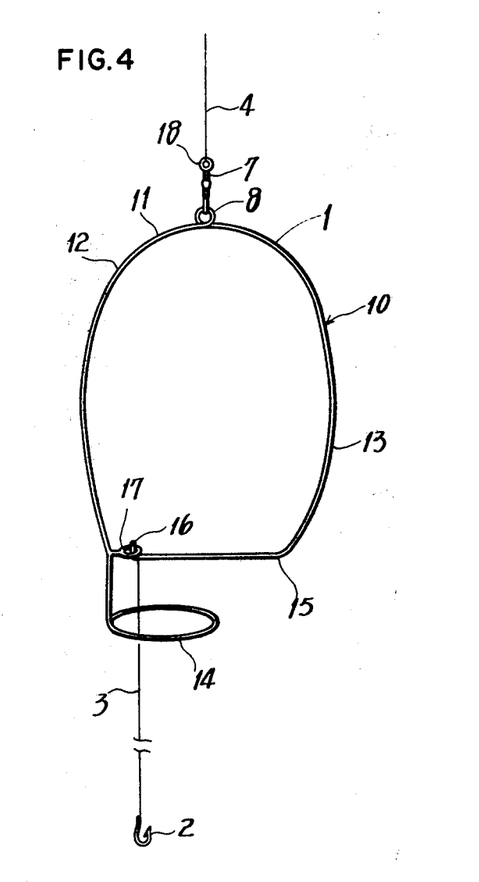
FIG. 4 is a front perspective view of a third embodiment.
Figure 5:
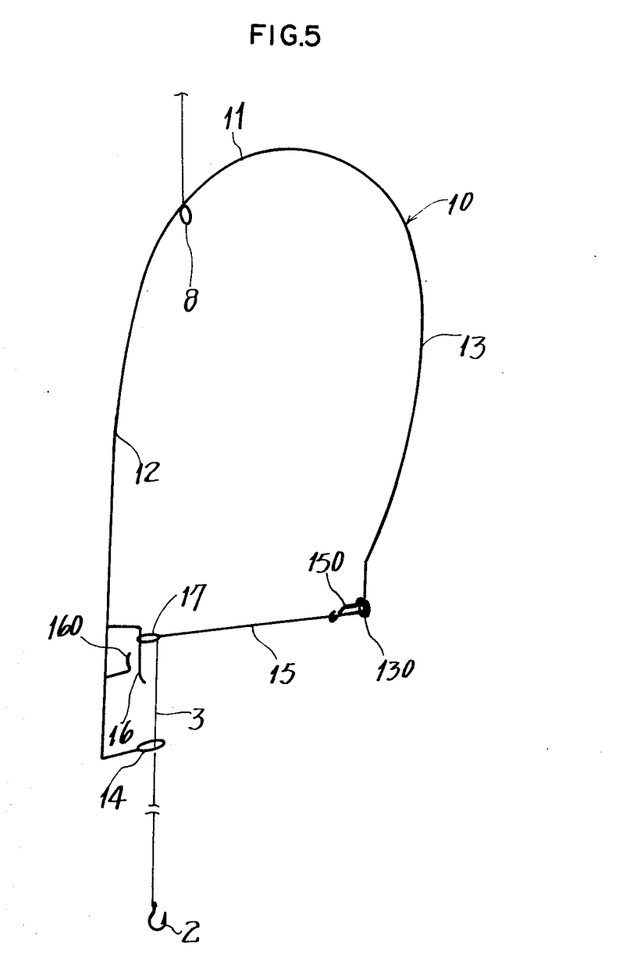
FIG. 5 is a front perspective view of a fourth embodiment.

The hook 16-and-ring 17 mechanism as shown in FIGS 1, 3 and 5, illustrating the first, second and fourth embodiments respectively of the present invention, represents one possible embodiment of said mechanism in which said hook 16 is a downward bent hook extending vertically from the left leg 12 of the arc 10 to the direction of the right leg 13, and the corresponding hook ring 17 facing upward is located at the end of the horizontal base 15. In contrast, the third embodiment as shown in FIG. 4 incorporates said hook 16 as an upward-bent hook located at the end of the horizontal base 15, and the corresponding hook ring 17 attached to the left leg 12 of the arc 10. In either form of embodiment of said hook 16-and-ring 17 mechanism, the hook 16 and hook ring 17 may be attached to their respective horizontal base 15 and left leg 12 by means of welding or other methods.

Another alternative embodiment relates to the horizontal base 15 and the method of its attachment to the right leg 13 of the arc 10. In the first, second and third embodiments, the horizontal base 15 is contiguous with the right leg 13 of the arc 10. Said horizontal base 15, and said right leg 13 may be either made up of one contiguous material or welded together. In contrast, in the fourth embodiment as shown in FIG. 5, the horizontal base 15 is pivotally connected with the right leg 13 by means of an intervening device, an eyelet 130. In order to facilitate a successful disengagement of the hook 16-and-ring 17 mechanism of the fourth embodiment, the fishing line 4 must be connected by the eyelet 8 of the elastic loop 1 at a point on the arcuate ceiling 11 substantially to the left of its climax, and thereby the arc length to the right of the eyelet 8 is made substantially longer than the arc length to the left of said eyelet 8. Such biasing is necessary so as to increase the distance between a fulcrum pivot and a point of application, and thereby to increase the deflection of the hook ring 17 with respect to the downward pulling force of the hook line 3. These two different embodiments of the horizontal base 15 require a different strength of the downward pulling power exerted on the horizontal base 15 necessary to disengage the hook 16-and-ring 17 mechanism. In the former embodiment as shown in FIGS. 1, 3 and 4, elasticity of restitution is transmitted directly to the horizontal base 15 and the left leg 12. Therefore, the hook ring 17 on said horizontal base 15 and the hook 16 on said left leg 12 are engaged with each other by relatively strong power of elastic restitution pulling in opposite directions. However, in the latter embodiment as shown in FIG. 5, the elasticity of restitution of the right leg 13 is transmitted flexibly through the eyelet 130 to the horizontal base 15, and therefore a relatively small amount of downward pulling force is necessary to disengage the hook 16-and-ring 17 mechanism. In other words, the fish catcher embodying the latter embodiment is more sensitive to a fish snapping at a bait because it reacts to less downward pulling force. Nonetheless, either embodiment will successfully strike a fish.

Another alternative embodiment relates to said hook line 3 and the method of its attachment to the elastic loop 1. As shown in FIGS. 1 and 3, the hook line 3 may be connected to the elastic loop 1 at the arcuate ceiling 11. Alternatively, as shown in FIGS. 4 and 5, the hook line 3 may be connected thereto at the horizontal base 15. In the former embodiment, said hook line 3 traverses through a guide 5 located on the right leg 13 at its lower portion, the hook ring 17 and the catch ring 14, and suspends the fishing hook 2. In the latter, said hook line 3 to the elastic loop 1 at its arcuate ceiling 11 may be facilitated, as shown in FIGS. 1 and 3, by a guide 6 on a twist return fitting 7. The principal function of the hook line 3 connected to the elastic loop 1 is to pull down the horizontal base 15 by the weight of a fish snapping at a bait and cause the disengagement of the hook 16-and-ring 17 mechanism. Either of the aforementioned alternative embodiments of attaching the hook line 3 to the elastic loop 1 effectively accomplishes this function.

Last alternative embodiment of the present invention relates to the overall shape of said elastic loop 1. In the first, third and fourth embodiments, as shown in FIGS. 1, 4 and 5, respectively, said elastic loop 1 has an oval-shape slightly larger than a semi-oval, while in the second embodiment, as shown in FIG. 3, it is substantially a semi-oval. In the case of the former embodiment, the hook line 3 seems to respond more quickly to the disengagement of the hook 16-and-ring 17 mechanism than in the case of the latter embodiment. Selecting the proper embodiment requires the careful consideration of the proper diameter and position of the catch ring 14, and also of the size and habit of a fish to be caught.

The structure hereinbefore described must be suspended from a fishing line 4 for the purpose of its porper operation. It may be attached to the fishing line 4 in the same manner as a conventional fishing sink is attached thereto. Because of the weight of the fish catcher itself, the use of such sink is no longer necessary to facilitate the sinking of the fishing line 4. Furthermore, a guide 18 mounted on a twist return fitting 7 may also be used to facilitate such attachment.

Figures 6A, 6B:
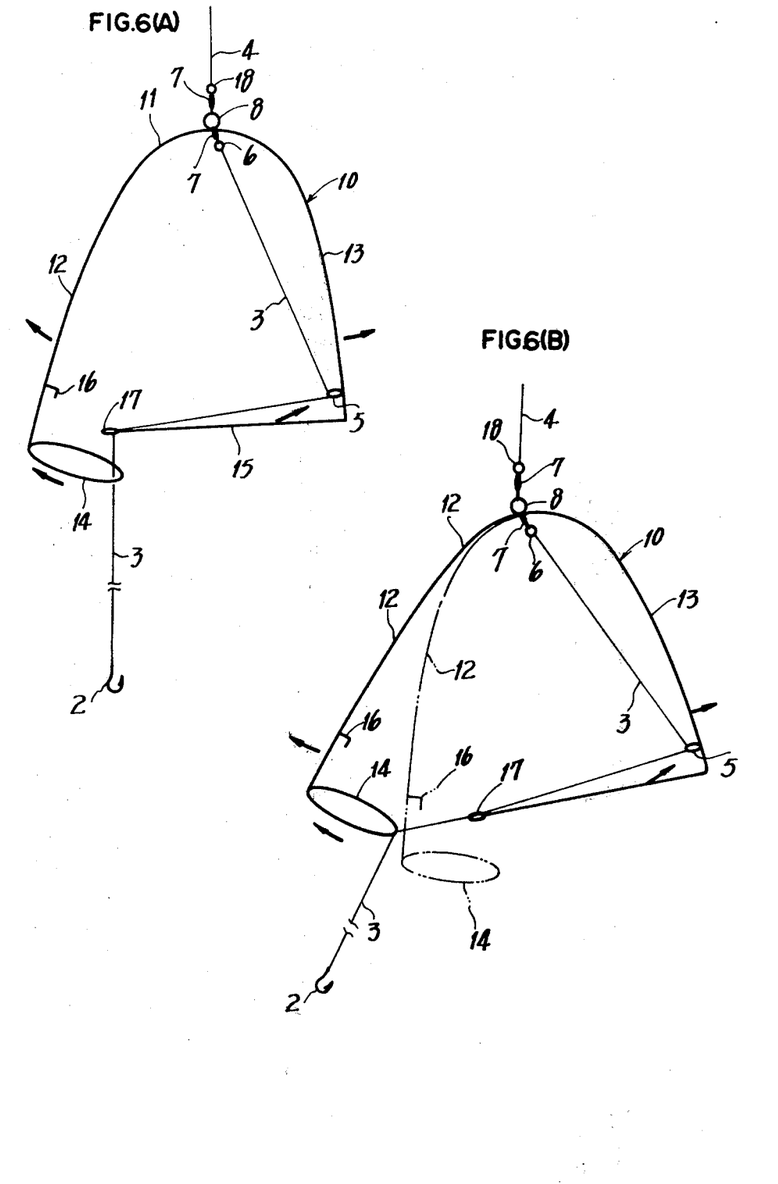
FIGS. 6(A) – (C) illustrate an operating principle of the fish catcher in accordance with the principles of the present invention.
Figure 6C:
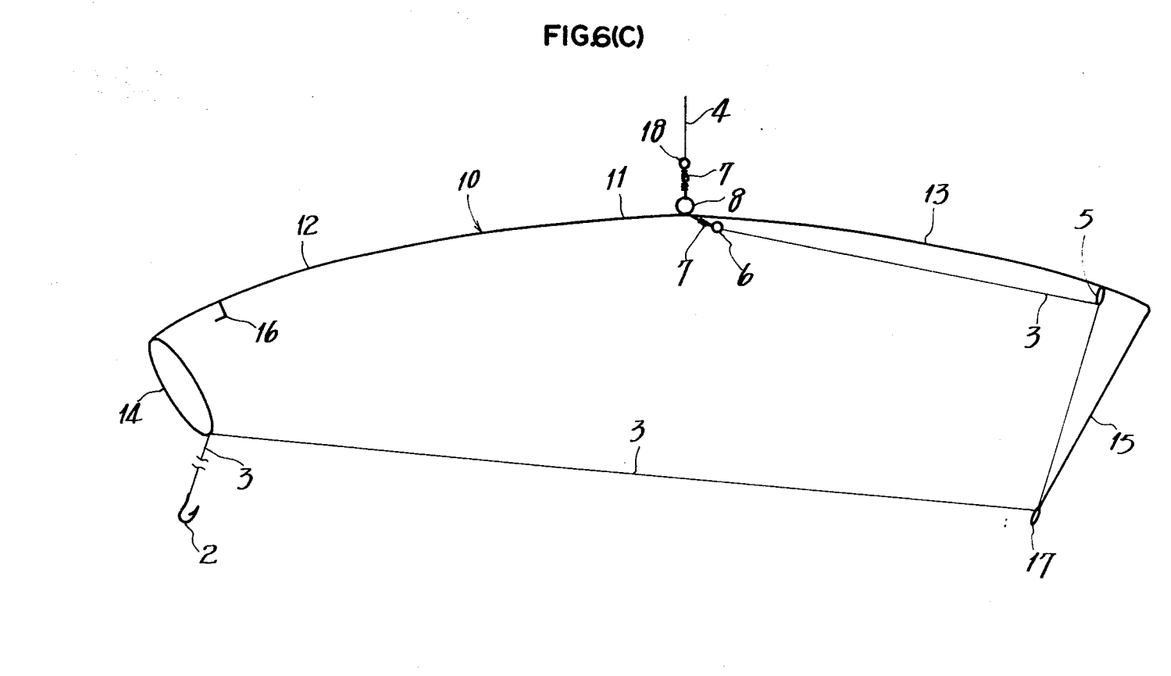
Figure 7:
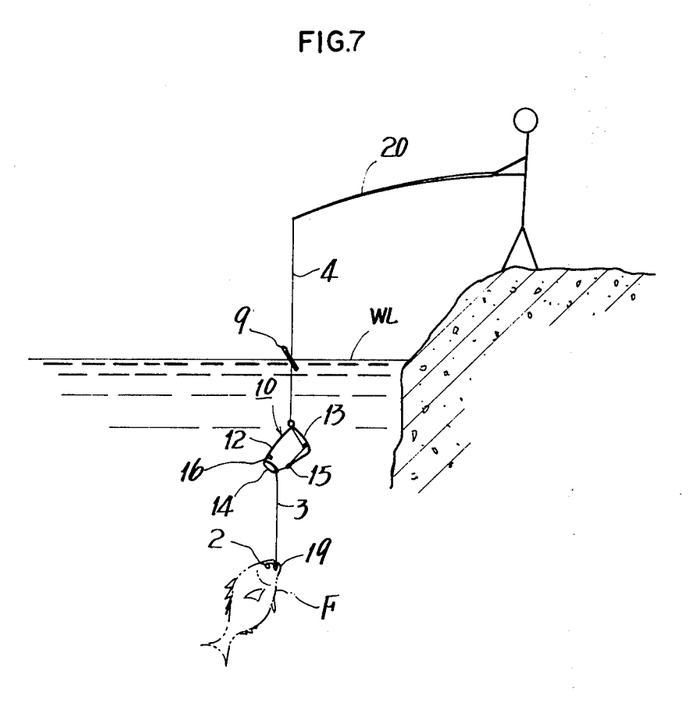
FIG. 7 illustrates the state of angler fishing with a rod and a line utilizing the fish catcher in accordance with the principles of the present invention.

Referring specifically to FIGS. 6(A), (B), (C) and 7, the operative principles of the fish catcher in accordance with the teachings of the present invention is hereinafter described in detail.

When a fish F snaps at a bait 19 on the fishing hook 2, the hook line 3 is pulled down. The horizontal base 15, being in turn pulled down by the hook line 3, causes the hook 16 to be disengaged from the hook ring 17. The disengagement of the hook 16-and-ring 17 mechanisms, in turn, causes the legs 12 and 13 to spring outward by elasticity of restitution. The catch ring 14 attached to the left leg 12 follows the outward movement of the left leg 12, whereas the hook line 3, either attached to the horizontal base 15 or traversing the guide 5 on the right leg 13, follows the movement of the right leg 13. Since the left leg 12 and right leg 13 spring outward to opposite directions, the hook line 3, inhibited its free movement by the catch ring 14, is pulled slantly upward, whereupon the fishing hook 2 catches the jaw of the fish F. Accordingly, while the fish catcher in accordance with the principles of the present invention changes its state from that shown in FIG. 6(A) to that in FIG. 6(C), it automatically strikes the fish with agility. Thereafter, an angler is informed of his winning by the movement of a float 9 or the tip of a fishing rod 20. All he needs to do to enjoy his winning is to lift the fishing rod 20 and draw the fish F into his hands. Even though the operative principles of the present invention have thus been described and illustrated in FIG. 7, with reference to its use in conjunction with the bait 19 and the fishing rod 20, the present invention may be used with equal effectiveness in conjunction with a lure in lieu of the bait 19 of a hand-fishing line in lieu of the fishing rod 20.

Having thus described the present invention, it is obvious that numerous modifications and departures may be made by those skilled in the art. Accordingly, it is understood that the above-described embodiment is merely illustrative of but a small number of many possible scientific embodiments which represent the application of the principles of the present invention. Thus, the invention is to be construed as limited only by the spirit and scope of the appended claims.

I claim:
1. A fish catcher to be suspended from a fishing line, said fish catcher comprising:
   a. an elongated member, said fishing line being connectable to the center of said elongated member, the leg portions of said member on either side of said center being resiliently bendable into a loop closed by means of a hook-and-ring mechanism including a hook and a hook ring firmly engageably retained with each other by the resilient restoring force of said bendable member;
   b. one of said hook and said hook ring being unitary with one leg portion at a location spaced from the terminal end thereof;
   c. said terminal end of said leg portion being formed into a catch ring of diameter substantially larger than said hook ring, the plane of said catch ring being generally perpendicular to the plane of said loop and positioned beneath the hook-and-ring mechanism; and
   d. a hook line being operatively connectable to the elongated member and depending from adjacent the hook and hook ring mechanism through said catch ring, said hook and hook ring mechanism being configured for disengagement by downward pulling force on said hook line.

2. A fish catcher according to claim 1 wherein said leg portion containing said catch ring is slightly longer than said other leg portion.

3. A fish catcher according to claim 1 wherein the other one of said hook and said hook ring is unitary with said leg portion not containing said catch ring.

4. A fish catcher according to claim 3 wherein said elongated member, said hook and hook ring, and said catch ring comprise an integral, unitary piece.

5. A fish catcher according to claim 1 comprising a unitary piece wherein said leg portion not containing said catch ring has a terminal part that is substantially horizontal with one of said hook and said hook ring at the free end thereof.

6. A fish catcher according to claim 1 wherein a straight rod is horizontally coupled to the terminal end of said leg portion not containing said catch ring, said straight rod having one of said hook and said hook ring situated at the other end thereof.

7. A hook setter to be suspended from a fishing line, said hook setter comprising:
   an elongated rod bendable into an arcuate shape, said rod including a left leg portion and a right leg portion, with said left leg portion being longer than said right leg portion;
   a substantially straight rod attached at the terminal end of said right leg;
   a latching mechanism having first and second releasably engageable members, one of said engageable members being affixed to said left leg portion at a location spaced from the terminal end thereof, and the other of said engageable members being affixed at the terminal end of said straight rod, said first and second members being firmly releasably engageable with each other by the resilient restoring force of said bendable rod;

a catch ring formed at the terminal end of said left leg portion, the plane of said catch ring being generally perpendicular to the plane of said bent rod;

a hook line operatively connected to said engageable member at the end of said straight rod, said hook line depending from said straight rod through said catch ring such that a pulling force on said hook line and connected straight rod will disengage said latching mechanism.

8. A hook setter according to claim 7 wherein said bendable rod, straight rod, latching mechanism, and catch ring comprise an integral, unitary member.

* * * * *